United States Patent [19]

Badger

[11] Patent Number: 4,690,045
[45] Date of Patent: Sep. 1, 1987

[54] UTILITY GAME BAG SYSTEM

[76] Inventor: Robert J. T. Badger, 2510 Alden St., Salt Lake City, Utah 84106

[21] Appl. No.: 753,774

[22] Filed: Jul. 11, 1985

[51] Int. Cl.$^4$ .............................................. A23L 3/00
[52] U.S. Cl. ...................................... 99/485; 17/1 R; 99/467
[58] Field of Search ................. 99/467, 473, 474, 475, 99/476, 481, 482, 483, 485; 17/1 R; 34/151, 72, 163; 8/94, 12, 19 R

[56] References Cited

U.S. PATENT DOCUMENTS

| | | | |
|---|---|---|---|
| 2,833,201 | 5/1958 | Simank | 99/481 |
| 3,752,373 | 8/1973 | Smith | 34/151 |
| 3,933,145 | 1/1976 | Reich | 99/476 |
| 3,971,308 | 7/1976 | Parker | 99/467 |
| 4,578,881 | 4/1986 | Karlsson | 34/151 |

*Primary Examiner*—Robert W. Jenkins
*Attorney, Agent, or Firm*—M. Reid Russell

[57] ABSTRACT

A utility game bag system including a game bag that can be a single layer or constructed in multiple layers to expose, alternatively, sun reflective or sun absorbing surfaces, and may include a vent therewith, and hanger system therefore for suspending the game bag from a tree, or the like, and for supporting an animal carcass, or a rack holding sections of an animal carcass therein, the system including a blower arranged to pass an air flow that may be water saturated or have smoke entrained therein into the game bag. The blower including a filter mat and housing and an arrangement to pass, as required, a flow of water thereto, wetting the filter mat wherethrough the blower pulls an air flow, with, alternatively, the blower inlet arranged for connection to a smoke generator.

11 Claims, 7 Drawing Figures

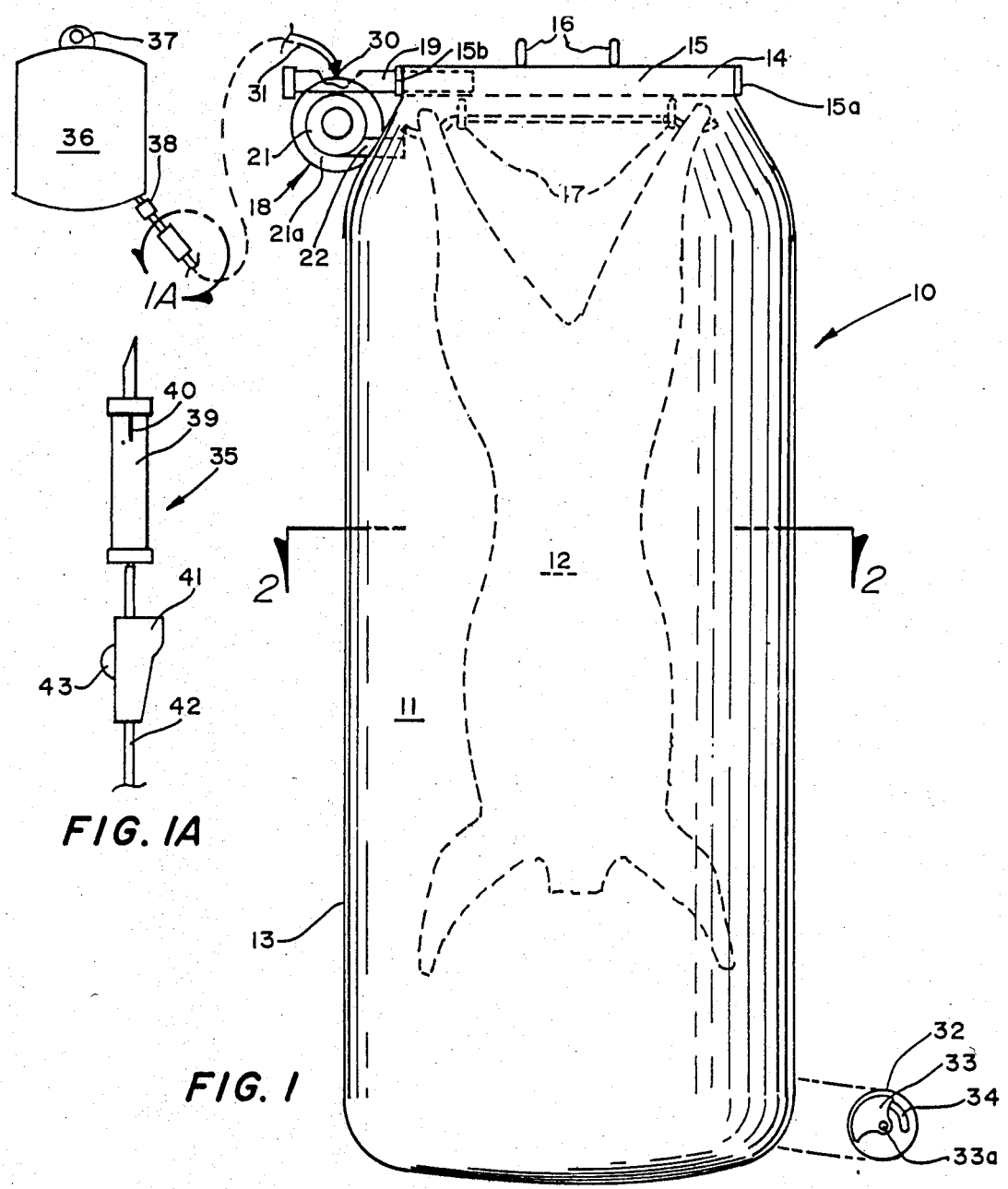
FIG. 1A
FIG. 1
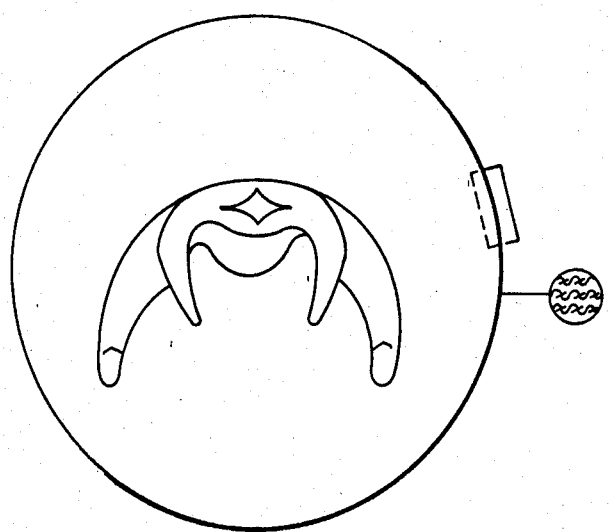
FIG. 2

UTILITY GAME BAG SYSTEM

BACKGROUND OF THE INVENTION

1. Field

The present invention relates to game bags for enclosing an animal carcass and hanging it in the wild and includes low volume airflow system for directing an airflow throughout the bag, over the carcass.

2. Prior Art

It has long been a problem for a hunter taking game in the wild, particularly a large game animal such as a deer, to preserve and protect that carcass until it can be cut, wrapped, and frozen. Typically, a hunter will leave the game suspended from a tree limb until he can obtain transportation, whereupon the heat and insects will begin to take their toll on the carcass. Often, by the time the hunter has cooled and finished preparing the carcass, a significantly large portion thereof will be ruined. Heretofore, game bags that have been available for covering such carcass have not provided for cooling it. Such covering has been to protect it from flies laying eggs thereon, but has not involved keeping the meat cool to avoid spoilage. Additionally, it is well know that a carcass can be wrapped with cheese cloth, or the like, and while such covering will protect the carcass to some degree from insect infestation, it will not be effective to prohibit heat damage and spoilage.

The present invention, as with the earlier game bags, provides for enclosing a freshly killed animal after it is gutted within a bag structure that can be suspended from a tree, or the like, in the wild. Unique to the present invention, is a combination of the game bag and hanger arrangement with a battery or solar cell driven fan or blower to provide an airflow into and through the game bag. The blower further includes a filter pad over an air inlet end connected to receive a drip flow of water thereover. The blower will thereby pull an airflow that is passed into the game bag, which game bag can include a venting arrangement for avoiding moisture buildup therein.

Additionally, where earlier game bags and wraps have only been concerned with providing a covering for the carcass, the present invention recognizes that, in addition to keeping the carcass cool, there may be occasions when it would be useful to smoke the meat to preserve it. The present invention, therefore, also includes a capability for pulling smoke from a canister type smoker or smoke generator through a connected hose into the game bag to both raise the temperature within the bag and provide a smoke source. To effectively smoke meat, such meat should be in sections and the smoke circulated therearound. To meet this need, the present invention, provides a collapsing rack arrangement for suspension in the game bag that is for receiving sections of meat arranged thereon.

Unlike earlier devices to wrap a carcass, the present invention employs a reflective game bag outer surface, to as much as possible, prevent the sun from warming of the bag interior. And, for smoking meat it has been found to be useful to provide a game bag surface that will absorb heat so as to make use of sun heating along with the heat in the smoke to raise the bag temperature. The present invention recognizes these conflicting needs and meets them by providing a game bag that is reversible, a reflective surface arranged on one surface thereof and with a sun absorbing or dark surface on the opposite surface.

Where a hunter is unable to move his kill to a cutting and wrapping facility for a period of time, the present invention provides an arrangement for preserving that carcass even over fairly lengthy periods of time in the wild. Such preservation has not been possible with earlier wraps and bags that have been concerned only with wrapping such carcass for the purpose only of avoiding insect infestation. The present invention therefore provides a system for both cooling such carcass and even treating it with smoke for protecting against spoilage and, along with covering the carcass, to minimize or avoid damage through insect infestation.

SUMMARY OF THE INVENTION

It is a principal object of the present invention to provide a utility game bag system whereby a hunter, taking a game animal, can preserve and protect that animal from spoilage and insects.

Another object of the present invention is to provide a utility game bag system whereby the carcass can be preserved and protected by providing a cooling airflow within the game bag or, alternatively, for passage of smoke and heat into the same game bag.

Another object of the present invention is to provide, for use with the utility game bag system, a game bag that may include reversible surfaces, one surface being a sun reflective surface, with the other a sun absorbent surface, for use, respectively, with the cooling or smoking arrangements of the invention.

Another object of the present invention is to provide, for arrangement with the game bag, a low volume fan or blower arrangement for passing an airflow into the game bag for use with both the cooling and smoking arrangements.

Still another object of the present invention is to provide, with the game bag, a vent system for alternatively containing an airflow within the bag or venting it after passage around a carcass therein.

Still another object of the present invention is to provide, with the low volume fan or blower arrangement, a filter mat for installation over the fan or blower air inlet and an arrangement for dripping water thereon to provide for cooling of the airflow pulled therethrough, and optionally, to provide for connection across the fan or blower inlet an appropriate hose for connection to a smoke generator, the fan or blower to pull smoke therefrom and pass it into the game bag.

Still another object of the present invention is to provide, as an alternative use for the fan or blower arrangement, for its use for cooling a tent or like structure.

In accordance with the above objects, the present invention is in a utility game bag system that may include a hanger device for supporting a game bag from a tree, or the like. The game bag is preferably arranged to be reversible having a sun reflective surface on one face thereof and a sun absorbing surface on the other. Though, of course, the game bag could be manufactured from a single layer and need not be reversible. The game bag can be hung from a hanger assembly, or rested horizontally in the event that hanging is not feasible, and includes an opening that extends along one longitudinal side thereof that can be closed, as a zipper. Additionally, the game bag includes an opening in a top end thereof to accommodate a fan or blower nozzle and preferably includes a variable vent structure fitted through the bag bottom.

The preferred hanger assembly incorporates, as a lateral support, a tube to receive a portion of an air displacement device, such as a fan or blower that is fitted therein. Which fan or blower preferably includes as an assembly for fitting into the hanger tube, a battery pack that contains a series arrangement of flashlight batteries, that provide power to the fan or blower. The hanger tube supports the fan or blower such that a nozzle end thereof can be fitted into the game bag to pass that fan or blower exhaust into the game bag. The fan or blower includes a filter mat housing for connection over the air inlet thereof, which housing contains a mat that is preferably open on both sides and includes a pack of wood chips or shavings like that used in a conventional evaporative cooler. The system further includes an arrangement for providing water to that filter mat with a water storage vessel and a drip feed, to provide a drip water flow to the mat. Alternatively, within the scope of disclosure, the invention can include an appropriate hose for coupling over that fan or blower air inlet, in lieu of the filter mat housing, which hose connects also to a smoke generator, such as a conventional canister smoker that is wood or charcoal burning. In such arrangement, the hose connects to the smoker exhaust, the fan or blower pulling the smoke flow therefrom and passing it out through the nozzle and into the game bag. In this arrangement, to contain the smoke within that bag, a vent is included in the game bag that is positionable to be closed or nearly closed and, as required, the game bag outer surface can be a sun absorbing surface such as a dark material, to raise the temperature appropriately therein. Additionally, to provide for effectively smoking the meat in this embodiment, the invention may include a rack structure for suspension from a carcass hanger within the game bag, to accomodate sections of that carcass positioned thereon to allow the smoke and heat to circulate therearound.

The game bag system may also be utilized with neither the filter mat-water drip arrangement, or smoke generator and coupling system. This, as dictated by circumstances such as the need of compactness of the system at times, when it is to be carried into the field, or an absence of the need for cooled air or smoke to be directed into the game bag, because of climate conditions.

In such circumstances the fan or blower assembly would be utilized to inflate the bag surrounding the carcass, facilitating the initial cooling and carrying away of the animal body heat entrapped within the meat, and to continue an airflow over the meat to minimize the detrimental effects of a stagment air mass and the heating and spoiling of the meat by natural elements. These two purposes, insert protection and cooling of the game meat, being among the primary purposes of the present invention, can therefore be accomplished by means of the bag and blower assembly alone. The addition of the filter mat- water drip system and or the smoke generator and coupling system serve to complete and enhance the entire system in its principle objective to provide a system whereby a game animal may be preserved and protected from spoilage and insects while in the field.

As an additional use, the air displacment fan or blower, including the filter mat and water supply arrangement for dripping water thereover, can be mounted to one end of a conventional tent structure, a nozzle end thereof fitted into the tent, for blowing cooled airflow through that tent interior.

BRIEF DESCRIPTION OF THE DRAWING

These and other objects will appear in the following detailed description in which preferred embodiments have been described in detail in conjunction with the accompanying drawings.

FIG. 1 is a front elevation view of a first embodiment of the utility game bag system of the present invention showing, in broken lines, as containing an animal carcass, a game bag portion thereof shown hung as it would be from a tree, or the like, and includes a water reservoir source that is also hung thereabove to supply a drip flow of water to a canister arranged across a fan or blower inlet;

FIG. 1A, a sectional view taken within the line 1A—1A of FIG. 1 showing a water drip feed arrangement for providing a measured flow of water from the resevoir source to the canister;

FIG. 2, a sectional view taken along the line 2—2 of FIG. 1 showing a cross sectional view of the utility game bag system where the game bag is formed from a single layer of material and showing the carcass therein;

DETAILED DESCRIPTION

Figure 3:
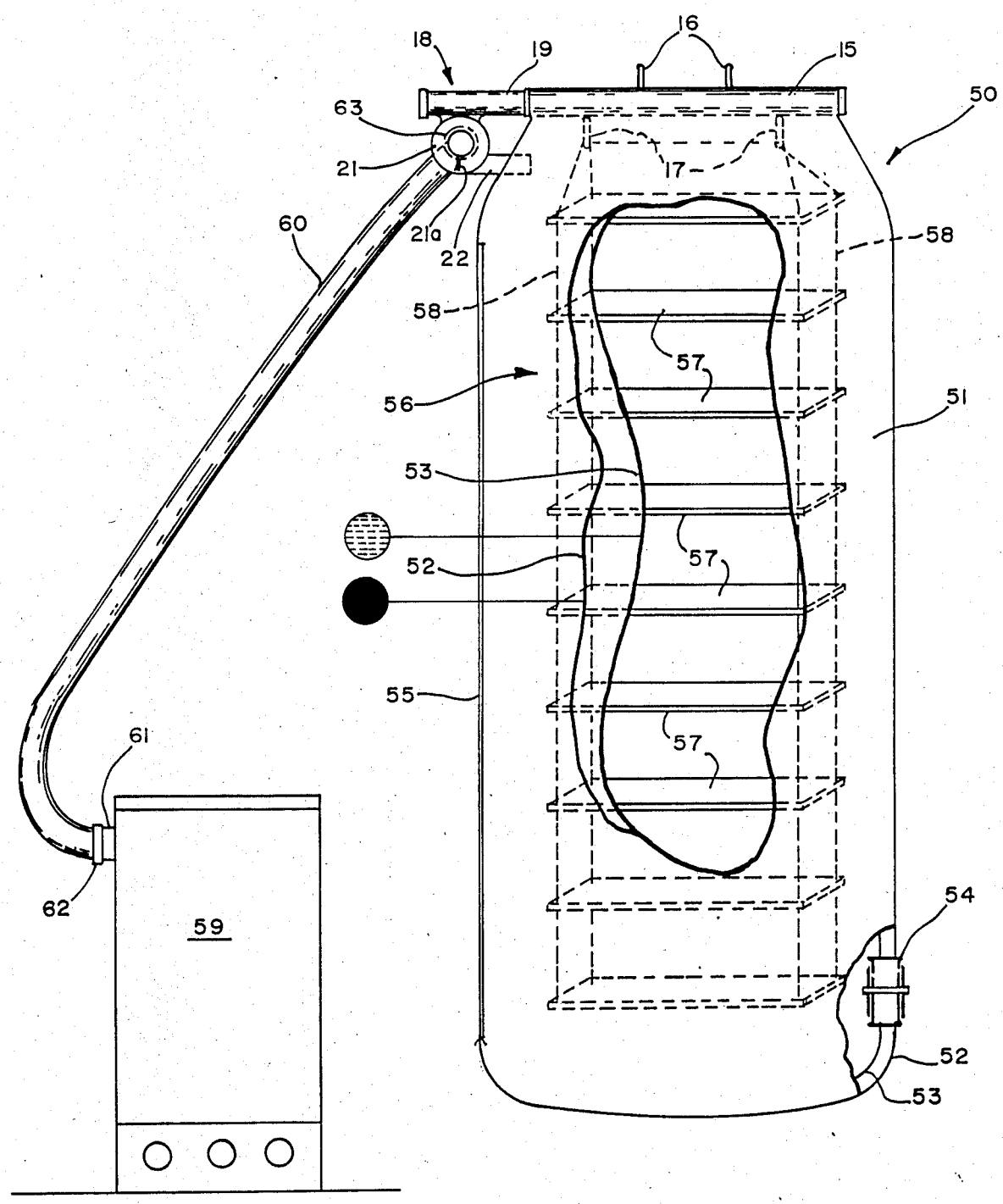
FIG. 3, a view like that of FIG. 1 showing a second embodiment of a utility game bag system where the game bag is formed to be reversible having different inner and outer layers and includes a rack arranged therein with a fan or blower shown connected by a pipe to a canister smoke generator arrangement for passing smoke to that fan or blower that, in turn passes it into the game bag.

Referring now to the drawings.

FIG. 1 shows a first embodiment of the uitility game bag system 10 of the present invention hereinafter referred to as game bag system. Shown therein, the game bag system 10 includes a game bag 11 that has sufficient dimensions to conveniently receive and enclose an animal carcass therein, as is shown in broken lines 12. The game bag is open longitudinally along one edge and includes a closure means, shown here as a zipper 13, that is secured laterally therealong that is openable to provide for convenient access into the game bag interior along the entire length thereof. Along a top edge of the game bag is arranged a sleeve 14 that will accommodate a hanger 15 installed therein, shown in broken lines. The hanger is preferably a tube and includes spaced apart rings 16 that extend vertically outwardly from the tube to be fitted through appropriate eyelets formed in bag sleeve 14. So arranged, the rings 16 are open to receive a rope, or the like, therethrough to support the hanger, as from a tree, or the like. Additionally, the tube 15 includes rings 17, shown in broken lines in FIG. 1, that face within the game bag, oppositely to rings 16, and are also for fitting through appropriate eyelets formed in of the bag sleeve 14. The rings 17 are for securing, as with ropes, the legs of the carcass 12, to maintain it suspended within the game bag 11, as illustrated in broken lines in FIG. 1. Additionally, as also will be described in detail with respect to FIG. 3, the rings 17 can be used to suspend a rack therefrom, that is preferably a folding rack, for maintaining trays thereon to support sections of meat, or the like.

Hanger tube 15, of course, should be a member of sufficient strength to support the bag weight and that of a carcass hung within. In practice a schedule 40 PVC pipe of 1½″ diameter has been found to be satisfactory for attaching the rings 16 and 17 thereto, and can be capped at the one end 15a. The opposite pipe end 15b is preferably open to receive a cylindrical battery pack 19, of a fan or blower 18, that is hereinafter referred to as "blower". Shown best in FIGS. 5 and 6, the battery pack 19 can be opened to accommodate, in end to end configuration, a number of batteries 20, that are preferably standard D cell type flashlight batteries. The batteries are electrically connected in series, for providing a source of electrical energy to operate blower 18, as will be described in detail hereinbelow. Battery pack 19 therefore provides both a mount for the blower to support it within hanger 15, and houses the dry cell batteries 20 as a power source. Optionally, not shown, in lieu of using the standard dry cell batteries, the blower 18 could be powered as with solar cells, or the like, could be provided with a different battery containing configuration, or could be supported differently from the hanger 15, all within the scope of this disclosure.

Figure 5:
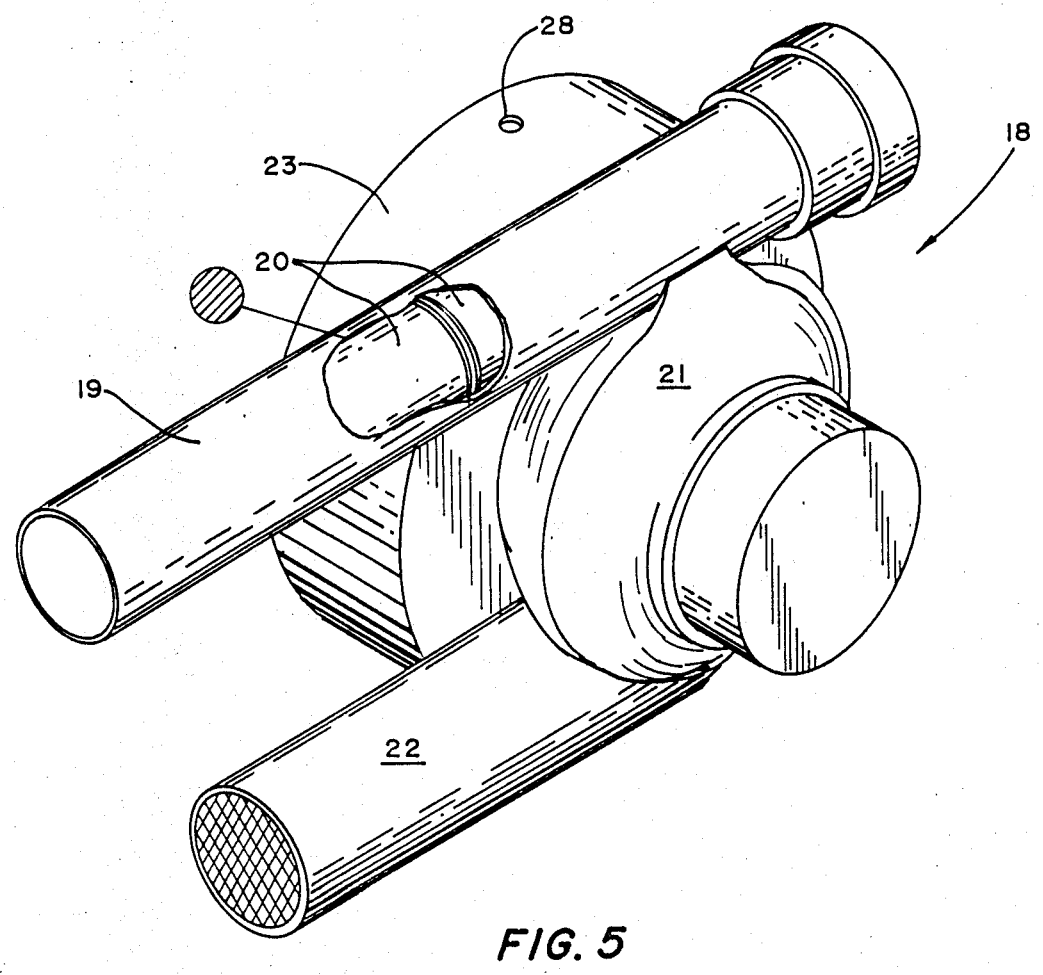
FIG. 5, shows a profile perspective view taken from one side of the preferred fan or blower of FIGS. 1 and 4.
Figure 6:
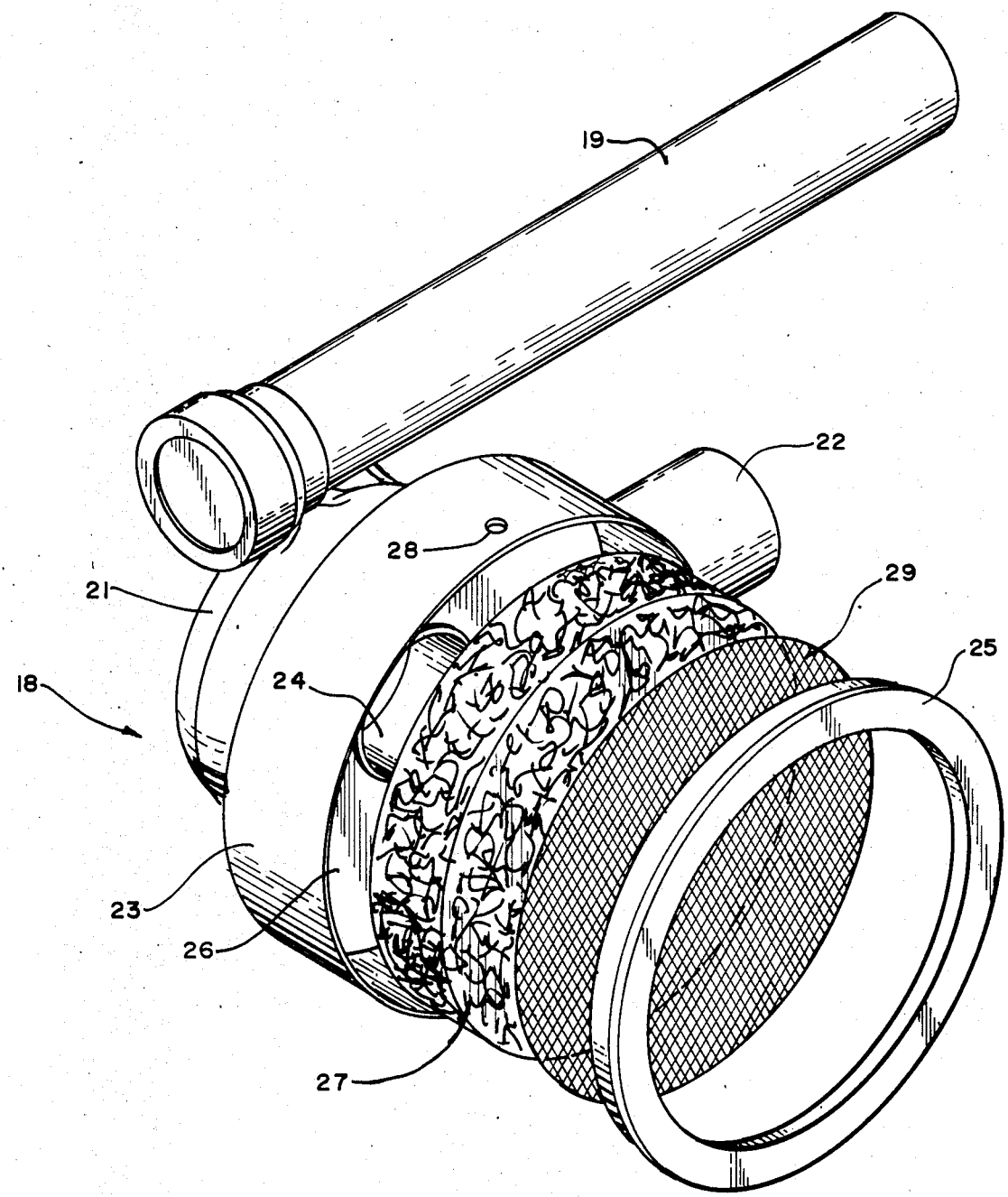
FIG. 6, shows a second profile perspective view like that of FIG. 5, except that it shows the fan or blower reversed and a filter mat canister exploded therefrom, with a portion of the canister broken away to expose the interior thereof.

Blower 18, as shown best in FIGS. 5 and 6, preferably includes a housing 21 that accommodates a standard blade, or squirrel cage fan, and fan motor wired through a switch 21a that connects the motor to the battery pack. In practice, a hair dryer such as one manufactured by CONAIR ® with the heating element disconnected has been used successfully for this purpose. In such arrangement, the blower is operated by connection to the flashlight batteries, turning the fan motor that pulls an airflow through an inlet annular ring 25. Which flow is exhausted through a nozzle 22. With the blower supported, as shown in FIGS. 1 and 3, nozzle 22 is fitted through an appropraite opening into the bag 11 for passing an airflow into the bag and circulating it therethrough. Carcass 12 is thereby cooled and the flow is either exhausted through the game bag 11 walls, or through a vent 32 whose function will be described in detail hereinbelow.

Shown best in FIG. 6, the blower 18 incorporates a separate canister housing 23 that fits over an annular ring 24, the housing 23 for receiving a retaining annular ring 25 fited therein. The canister housing, within an open face 26 thereof, accomodates a filter mat 27 that may be a single layer or a double layer, as shown in FIG. 6, and is maintained therein by retaining annular ring 25. The filter mat is preferably an arrangement of wood shavings, or like water absorbing materials, that are maintained together, like a mat material as would be used in a conventional evaporative cooler for holding water thereon as an airflow is pulled through the mat. To provide a water flow into and throughout filter mat 27, an opening 28 is formed through the canister housing 23 to accommodate a nozzle end 30 of a water drip hose 31 installed therein. So arranged, water is circulated over that filter mat 27 wherethrough the blower fan pulls an airflow. The airflow is thereby cooled in its passage through the water saturated mat, with that airflow then exhausted through blower mozzle 22 into bag 11, as shown in FIG. 1. A water saturated airflow is thereby provided into the bag 11, the airflow traveling around and along the carcass and exhausts through the bag material itself or, optionally, through an exhaust vent 32, that is shown broken away from the game bag of FIG. 1. Vent 32 as shown in FIG. 2, is preferably installed in the bag corner that is diagonally opposite to the bag opening wherethrough the blower nozzle 22 is installed, and is preferably arranged such that the open area or passage therethrough can be varied. Shown in FIG. 1, the preferred vent 32 includes a shutter or plate 33 that is pivotly coupled at 33a to rotate therearound to cover an elongate hole 34 formed through the opposite faces of the vent body. So arranged, by appropriately pivoting the shutter 33, the open area of the elongate opening 34 is exposed to control an airflow therethrough for providing a desired cool air retention while evacuating unwanted moisture from within the bag 11. So arranged, the carcass 12 can be cooled within the game bag while venting unwanted moisture.

Water supplied through the hose 31 to nozzle end 30 is preferably at a slow drip rate. To provide that preferred drip rate flow, as shown best in FIG. 1A, a drip feed 35 is provided for arrangement between a source of water, shown as a flexible container 36 in FIG. 1, that includes an eyelet 37, or the like, formed therein for hanging it from a tree. The drip feed 35, shown in FIG. 1A, is preferably arranged in the hose 31 between a flexible container drain 38 and the nozzle end 31, shown in FIG. 1, so as to pass a constant drip flow. In practice, shown in FIG. 1A. the drip feed 35 is preferably a drip feed common for use in a hospital setting as for an intravenous liquid drip that involves a central tube 39 that is arranged to receive a liquid flow through a hollow needle 40, the central tube maintaining a head of liquid therein that is then passed through pinch flow device 41 that involves an adjustable obstruction. The pinch flow device adjustable obstruction is preferably arranged as an eccentric wheel 43 that is arranged to ride against a flexible tube 42. Turning of wheel 43 changes the contact pressure thereof against flexible tube 42 to limit the cross sectional area of that tube, controlling flow therethrough. Thereby, a drip flow can be provided that is adjustable to meet the need for a water flow over the filter mat 27. In practice, a flow controlled device manufactured by Jelco Medical that is identified for medical uses, has been found to be satisfactory for this application.

FIGS. 1 and 2 show a first preferred embodiment of the utility game bag system 10 with a carcass 12 arranged therein, with a second preferred embodiment of the utility game bag system 50 shown in FIG. 3. The described preferred blower 18 shown in the FIGS. 5 and 6 is intended for use in both the embodiments of FIGS. 1 and 3. In FIG. 6, the blower canister housing 23 is shown exploded away from the inlet annular ring 24. Wherethrough an airflow is pulled with that airflow exhausted through the nozzle 22 into the game bag. The second embodiment of the present invention in a utility game bag system 50 of FIG. 3, hereinafter referred to as game bag system, preferably utilizes the same blower 18, less the canister housing 23 containing the filter mat 27. As shown in FIG. 3, the game bag system 50 includes a game bag 51 that is shown with the central section removed therefrom to illustrate that the bag of this embodiment is formed to have two layers 52 and 53, that are, essentially inner and outer bags. The outer layer 52 will be part of a smoker system and as such should be a sun absorbing surface to maintain a high temperature within the bag 51. Such surface could be a material having a dark or black color to absorb sunlight, to elevate the bag interior temperature to a point higher than the surrounding air. The game bag 51, as shown in FIG. 3, is a dual purpose bag, for function as a smoker system, and can function also as to cool an animal carcass as illustrated and described with respect to FIGS. 1 and 2. As a cooler, game bag 51 is reversed or turned inside out from that arrangement shown in FIG. 3. The inner layer 53 then becomes the outer layer, which layer is preferably a sun reflective surface such as would tend to maintain the bag interior temperature at a lowest possible level. Such sun reflective surface could either be a white fabric or optionally could involve a silvered or metalic surface. Where FIG. 3 shows the two layers of game bag 51 as being separate and distinct, obviously they could be a single with, respectively, sun reflective and sun absorbing surfaces on opposite faces thereof. Additionally, like the game bag of as in FIGS. 1 and 2, the preferred game bag 51 can be such so as to allow a passage of air therethrough, although the game bag of FIG. 3, as it involves two layers may be less suitable for passing an airlfow through the bag material. Therefore, the game bag system 50 preferably includes a vent 54, that is preferably essentially like the vent 32 shown in FIGS. 1 and 2, except that, as the game bag 51 is reversible, the vent 54 should be openable from either face thereof. Vent 54 therefore preferably consists of a single center pivot in the vent body that is like the pivot 33a of vent 32 and includes on each end of that pivot, plates or wipers 33, that are pivoted to either close or open over elongate opening therethrough. So arranged, the vent 54 can be operated with either bag surface 52 or 53 faced outwardly.

The game bag 51, as set out above, is preferably reversible and, like the game bag 11 preferably includes a longitudinal opening, with a zipper secured therein that is arranged to be operated from either face thereof. The game bag 51 also includes a hanger 15, that is the same as that described with respect to FIG. 1, and includes the same oppositely facing pairs of rings 16 and 17. Unlike the hanger arrangement that involves sleeve 14 in FIG. 1, the game bag 51 top where the hanger 15 is arranged, to be reversable as described, cannot include a sleeve.

Shown in the FIG. 3, the game bag 51 interior, as viewed through the cut out centered longitudinal section, contains a rack or stack of shelves 56 wherein individual shelves 57 are suspended apart from one another with corners of each secured to a chain 58, wire, or like arrangement, such that the shelves will accordian apart. The rack of shelves is maintained within game bag 51 by connecting the ends of chain 58 through rings 17, it as shown in FIG. 3. So arranged, sections or segments of meat cut from the carcass 12 can be placed appropriately on the shelves, allowing a uniform airflow about that meat to allow the game bag system 50 to function as a smoker.

In the configuration of FIG. 3 additional to the game bag 51 and blower 18, the system includes a smoker generator 59 and a hose 60 for connecting the outlet of that smoker generator to the inlet annular ring 24 of the blower. In assembling the system, the smoke generator exhaust 61 will receive an end of hose 60 telescope thereover that is secured by tightening of a clamp 62 therearound, which clamp can be a conventional radiator clamp, or the like, for sealing that hose 60 end thereto. Similarly, the other end of hose 60 is preferably telescoped over the inlet annular ring 24 of blower 18 and is secured thereto by installation of a clamp 62 therearound, which clamp 63 is like clamp 62. So arranged, the smoke exhausted from the smoke generator 59, which can be a kettle or canister charcoal or wood cooker, will be pulled by blower 18 through hose 60 and exhausted through nozzle 22 into the game bag 51. The arrangement of FIG. 3 will thereby function as a smoker.

In practice, it has been found that a temperature of 125° or more is required to provide an adequate smoking of meat cut into strips or sections, which temperature is obtained by having the sun absorbing surface of the game bag exposed to the sun along with the heat present within the smoke exhausted or vented from smoke generator 59. The rate of travel of the smoke through the game bag is controlled by operation of the vent 54. In practice, a canister smoker manufactured by LI'L SMOKER ® has been found to work satisfactorily, and can be used as both a source of smoke and as a cooking device for cooking meat on a grate portion thereof, not shown.

Figure 4:
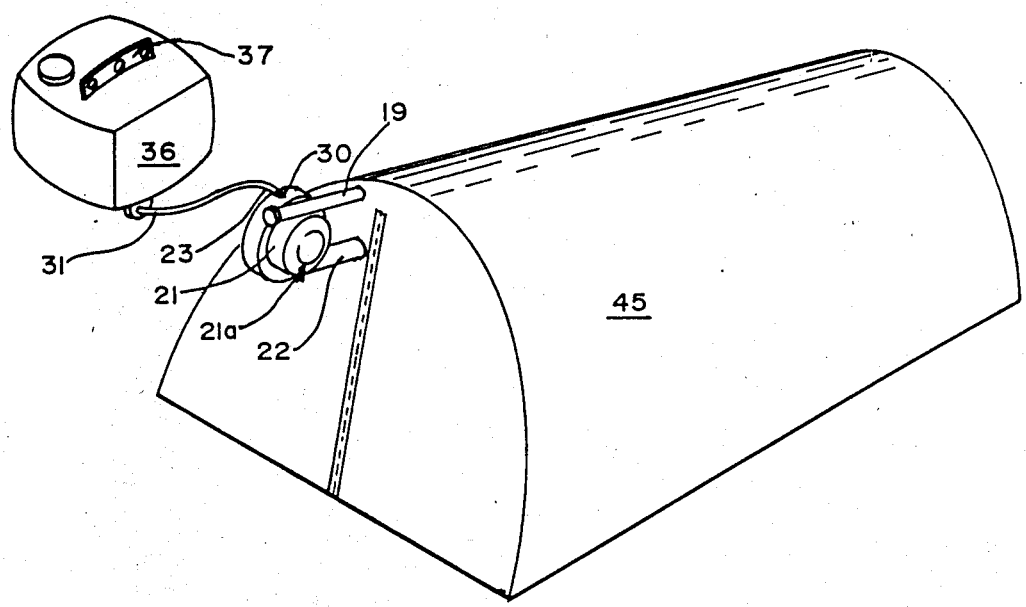
FIG. 4, shows the fan or blower arranged with a conventional tent, to cool the interior, and also shows the water reservoir source connected to that fan or blower to provide a dripping waterflow thereto, a nozzle end thereof fitted into the tent through a tent flap.

The present invention is the utility game bag system, as shown in the embodiments of FIGS. 1 and 3, respectively, provides a versitile system for preserving game taken in the wild. In practice, using a battery pack 19 having a length to accommodate four conventional D cell batteries in series, it has been found that the blower 18 will function for approximately fourty eight (48) hours. And, by using of the blower fan during the hot periods or times of the day only, carcass 12 can be maintained at a fresh state for approximately six (6) days. During which cooling, the game bag will prohibit entry of insects that could otherwise lay eggs on the carcass and spoil parts or all thereof. The present invention thereby provides a system for temporarily preserving meat, as with the cooling airflow and can provide for permanently preserving that meat by smokinhg it. Further, as an additional use, the blower 18, including the canister housing 23 and filter mat 27 with a water source can be used for cooling a hunter's tent when not is use for preserving game. Such use of blower 18 is shown in FIG. 4, that shows the blower nozzle 22 directed into a conventional tent 45. In this configuration, the nozzle 22 is fitted through an open tent flap, port or window area, with the battery pack 19 maintained to the tent top as by installing it onto or over a center rod, or like structure or, the battery pack 19 could even be supported independently from the tent, not shown. The flexible container 36 can be hung from a tree, otherwise supported to be above the blower 18. So arranged, a water saturated or water cooled airflow can be passed through the tent 45, the air flow venting out an opposite tent end, either through a screened window or open flap area. Obviously, for most effective cooling of the tent, the tent should be as air tight as possible to facilitate retaining the airflow therein as it passes from one end to the other.

As shown herein have been described several embodiments and uses of the present invention in a utility game bag system and components thereof. It should however be understood that other arrangements and uses to those described are possible within the combination without departing from the subject matter coming within the scope of the following claims, which claims I regard as my invention.

I claim:

1. A game bag system comprising, a game bag having length, width and thickness dimensions sufficient to contain an animal carcass therein and including an opening and closure means therefore for providing access to said game bag interior; a hanger means for connection in supporting engagement to said game bag for supporting said game bag; blower means for arrangement with said game bag such that a discharge nozzle thereof is arranged to discharge into said game bag, said blower means to provide an airflow into said game bag that is pulled through an inlet thereof; a filter mat canister means for coupling to said blower means, over an inlet thereof, such that a filter mat means therein will be positioned to extend across said blower means inlet; and means for providing water to wet said filter mat wherethrough said blower pulls an airflow.

2. A game bag system as recited in claim 1, further including means for exhausting an airflow out from the game bag.

3. A game bag system as recited in claim 2, wherein the means for exhausting an airflow is a vent means for inclusion in a wall of said game bag to provide a variable closure arrangement whereby the area of an opening through said vent means can be adjusted.

4. A game bag system as recited in claim 1, wherein the blower means includes an electric motor and battery power source therefore for turning a fan blade (and includes for providing electrical energy to operate said electric motor).

5. A game bag system as recited in claim 1, wherein the filter mat means is a mat formed from wood shavings or chips that will absorb water; and the means for providing water to wet said filter mat means is a vessel arranged to hold water that includes a hanger means, and has a drain for connection to a hose to pass water therethrough and through a nozzle that is installed to the filter mat canister means so as to provide a water flow to wet said filter mat means.

6. A game bag system as recited in claim 5, further including flow control means for controlling the rate of water flowing through the hose.

7. A game bag system as recited in claim 6, wherein the flow control means is an adjustable hose constriction arrangement whereby the hose can be partially closed to appropriately control the water flow rate therethrough.

8. A game bag system as recited in claim 7, wherein the flow control means is a drip flow regulator.

9. A game bag system as recited in claim 1, wherein the game bag is formed from a single layer of material.

10. A game bag system as recited in claim 9, wherein the material used to construct the game bag is a sun reflective material.

11. A game bag system as recited in claim 9, wherein the material used to construct the game bag is sufficiently porous to just allow the airflow generated by the blower means to pass therethrough.

* * * * *